United States Patent [19]
Reed et al.

[11] Patent Number: 5,257,609
[45] Date of Patent: Nov. 2, 1993

[54] COMBUSTION EMISSION REDUCTION DEVICE

[76] Inventors: Morgan P. Reed, 700 S. Eastern, Rayne, La. 70578; Daniel J. Redmond, P.O. Box 1060, Breaux Bridge, La. 70517; Donald C. Redmond, 414 Elmwood Dr., Lafayette, La. 70503

[21] Appl. No.: 710,091

[22] Filed: Jun. 4, 1991

[51] Int. Cl.⁵ ............................................. F02M 31/00
[52] U.S. Cl. ................................................... 123/557
[58] Field of Search ............... 123/543, 545, 547, 549, 123/552, 555, 557, 538

[56] References Cited

U.S. PATENT DOCUMENTS

| | | | |
|---|---|---|---|
| 4,368,716 | 1/1983 | Davis | 123/557 |
| 4,442,819 | 4/1984 | Veach | 123/557 |
| 4,594,991 | 6/1986 | Harvey | 123/557 |
| 4,611,567 | 9/1986 | Covey | 123/557 |
| 4,846,137 | 7/1989 | Ray | 123/557 |
| 4,883,040 | 11/1989 | Rocky | 123/545 |
| 4,926,830 | 5/1990 | McNelley | 123/557 |

Primary Examiner—Noah P. Kamen

[57] ABSTRACT

A combustion emission reduction device in a simplified form capable of processing fuel prior to combustion in associated combustion devices, combustion chambers and internal combustion engines in such a manner so as to reduce harmful combustion emissions and improve combustion efficiency by delivering processed to the combustion chamber which is capable of cleaner and more complete combustion. The combustion emission reduction device utilizes anti-vaporlock capabilities, pressure releases, an internal expansion valve and a series of baffles and chambers under heat, chilling, turbulence and pressure to process fuel but has no moving parts, utilizes safe and simple construction, no internal gaskets, no external controls, is completely automatic once correctly installed and is fairly inexpensive to construct It utilizes external heat and cooling sources and external fuel pump or fuel feeding system pressure to cause internal interactions within the device capable of processing fuel to obtained the above mentioned results.

16 Claims, 18 Drawing Sheets

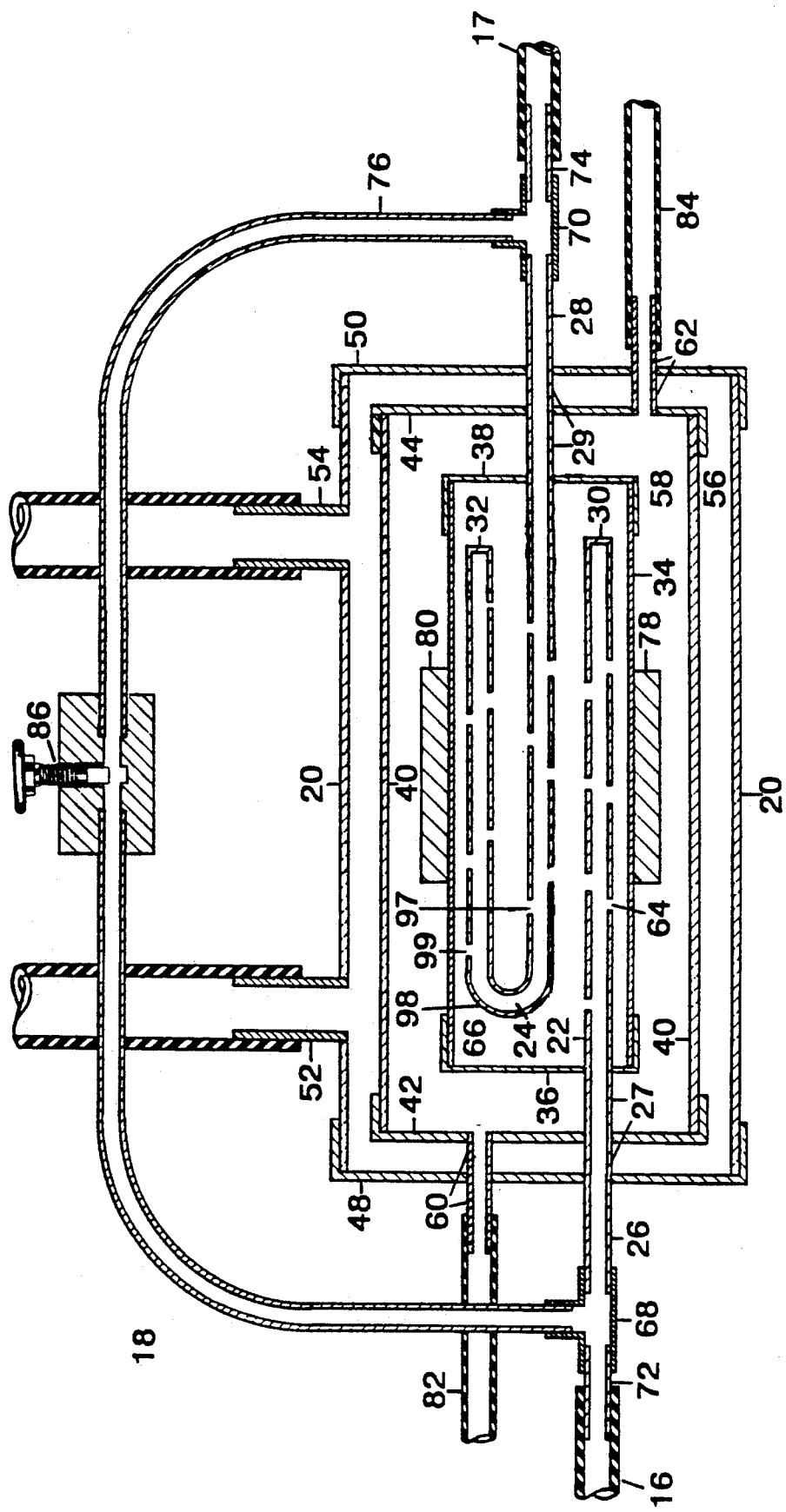

COMBUSTION EMISSION REDUCTION DEVICE

DEFINITION OF TERMS USED

Anti-vaporlock Device When used herein, the term "anti-vaporlock device" refers to an expansion chamber for fuel vapors which is designed to prevent engine stoppage due to an interruption of fuel flow by fuel bubbles, known as "vaporlock", caused by overheating of fuel.

Applications: The term "application" or "applications", when used in conjunction with the various uses of the combustion emission reduction device, shall include but is not limited to its use with various water/liquid cooled internal combustion engines, air cooled internal combustion engines, boilers, furnaces, heaters, chemical production processes, chemical end users and other processes or sources of emissions. Its usage in the reduction of emissions from various sources may include various energy/heat sources, various numbers of chambers, various cooling sources, and various fuel sources to be treated.

Carburetor: When used herein in conjunction with combustion processes using a carburetor, the term shall mean its carburetor as such, but otherwise, the term may also refer to any means of fuel regulation such as fuel injection systems or any other means of regulating, distributing or positioning fuel into combustion chambers Cylindrical Housing: The term "cylindrical housing" when used herein is used to describe the probable shape of various passages and chamber walls described herein, but is not intended to be a limitation on the shape of the passages, chamber walls or any other structures used in the combustion emission reduction device which may vary according to applications and various models thereof Energy Source: When used herein, the term "energy source" refers to any of the various regulated external sources of energy/heat which may be used to treat the applicable fuel within the combustion emission reduction device. Some possible sources of energy applicable herein include, but are not limited to, liquid engine coolant, water, anti-freeze, exhaust gases, externally heated gases or liquids, electric or electronic heating elements, steam, motor oil, hydraulic oil, transmission fluid, or any other heat exchange sources.

Engine: When used herein, the term "engine" may refer to the water/liquid cooled internal combustion engine (used herein for illustrative purposes) or may also include any other type of engine and/or combustion chamber or emission source from which emissions might be released Engine Coolant: When used herein, the term "engine coolant", if used with a liquid/water-cooled internal combustion engine, shall mean water or anti-freeze or any combination thereof, or any other liquid used to cool said liquid cooled internal combustion engine. In the description of the instant invention, a conventional form of a gasoline fueled, water/liquid cooled internal combustion engine is used for illustrative purposes. In this illustration, the heated engine coolant of an engine is used as an energy source to process or treat the fuel prior to combustion. However, in other applications not specifically illustrated herein, but for which the instant invention is applicable, the term engine coolant is used to define any energy source used in conjunction with the combustion emission reduction device.

Fifth Chamber: When used herein, the term "fifth chamber" shall mean an enclosed air chamber between the second chamber and first chamber as represented by chamber 102 of FIG. 8, described as the space within cylindrical housing 104 and end walls 106 and 108, but outside of the first chamber housing 34. The fifth chamber 102 would be included in certain applications as a second air cooled chamber to further modulate the flow of energy from the surfaces of the liquid engine coolant chamber to the fuel passages and chambers of the instant invention through which the fuel to be treated passes. The fifth chamber may or may not include air inlet and outlet passages 110 and 112, which would extend from the end walls of the fifth chamber through and out of the second and third chamber end walls, without communication with either the second or third chambers.

First Chamber: When used herein, the term "first chamber" shall mean chamber 66 of FIG. 7 described as the space within cylindrical housing 34 and end walls 36 and 38. The fuel inlet passage and fuel outlet passage communicate into, within and out of this first chamber, which is where the fuel is processed for emissions reduction prior to combustion. The fourth chamber is located within the first chamber Fourth Chamber: When used herein the term "fourth chamber" shall mean chamber 90 of FIG. 7, described as the space within cylindrical housing 92 and end walls 94 and 96 but outside of the perforated fuel outlet passage 24. The fourth chamber serves as an anti-vaporlock device for the instant invention.

Fuel: The term "fuel" as used herein, refers to various liquid or gaseous energy sources used in combustion processes. This includes, but is not limited to, leaded gasoline, un-leaded gasoline, diesel oil, kerosene, fuel oil, alcohols, and natural gas, methane, liquefied petroleum gases, other combustible gases or any other fuels used in combustion processes.

Fuel Inlet Passage: The term "fuel inlet passage" as used herein, is the aggregate of parts numbered 22,26,27 and 72 shown on FIG. 7 hereof (sometimes stated collectively as 22/26/27/72).

Fuel Outlet Passage: The term "fuel outlet passage" as used herein, is the aggregate of parts numbered 24,28,29,74 and 98 shown on FIG. 7 hereof (sometimes stated collectively as 24/28/29/74/98).

Heat Source: The term "heat source" as used herein shall be defined as being synonymous with the term "energy source" defined above.

Instant Invention: The term "instant invention" as used herein shall mean the "combustion emission reduction device" for which the application for patent is being made in its various forms stated in the body hereof or in the claims section and figures of this application for patent.

Interior Fuel Inlet Passage: The term "interior fuel inlet passage" as used herein, is that part numbered 22 shown on FIG. 7 hereof The interior fuel inlet passage is the portion of the fuel inlet passage located within the first chamber. The interior fuel inlet passage is closed at its innermost end and is perforated along its length, allowing communication with the first chamber.

Interior Fuel Outlet Passage: The term "interior fuel outlet passage" as used herein, is that part numbered 24 shown on FIG. 7 hereof. The interior fuel outlet passage is closed at its innermost end and is the perforated portion of the fuel outlet passage located within the first and/or the fourth chamber, which is in turn located within the first chamber, including the "J" Device, allowing communication with the first chamber.

"J" Device: The term "J Device" as used herein, is that part numbered 98 shown on FIG. 7 hereof. The "J" Device is the curved extension of the interior fuel outlet passage 24 which positions a portion of the interior fuel inlet passage above the fourth chamber The "J" Device is that non-perforated portion of the interior fuel outlet passage which is used to effect an overhead bend thereof.

Manifold Vacuum Air: Where the term "manifold vacuum air" is used herein in conjunction with a conventional form of water-cooled internal combustion engine, it shall mean manifold vacuum air, but otherwise, the term may also refer to the flow of any cooling medium used for modulating energy flow between the third chamber to the first chamber. In this illustrative use with a liquid cooled internal combustion engine, manifold vacuum air is sometimes used in the second chamber as a cooling medium to moderate the flow of energy between the third chamber and the first chamber so that the proper conditions are present in the first chamber to treat the fuel prior to combustion. In different applications, other external cooling sources may be used in place of manifold vacuum air such as water, fuel, air, liquids, gases or refrigerants.

Second Chamber: When used herein the term "second chamber" shall mean chamber 58 of FIG. 7, described as the space within cylindrical housing 40 and end walls 42 and 44 but outside of the first chamber 34. Manifold vacuum air as described above is used in the second chamber as a cooling medium to moderate the flow of energy between the third chamber and the first chamber.

Third Chamber: When used herein the term "third chamber" shall mean chamber 56 of FIG. 7, described as the space within cylindrical housing 20 and end walls 48 and 50 but outside of the second chamber 40. Liquid engine coolant is circulated through the third chamber and is the source of energy used to treat fuel in the first chamber.

BACKGROUND OF THE INVENTION

Various forms of emission reduction devices heretofore have been provided to decrease emissions operation of existing internal combustion engines or combustion processes utilizing liquid or gaseous fuels However, most of these previously known forms of emission reduction devices either provide treatment of combustion by-products in the exhaust system such as the use of catalytic converters or by re-burning of a portion of the exhaust gases emitted Accordingly, a need exists for a simplified form of emission reduction device capable of processing engine fuel prior to combustion in the associated combustion engine or combustion chamber.

Examples of previously known forms of emission reduction devices of this type, including some of the general structural and operational features of the instant invention, are unknown to the applicant, however similar structural features to the instant invention are found in U.S. Pat. No. 4,422,429, a fuel heater patented by Morgan P. Reed, one of the applicants herein.

The instant invention is different from the fuel heater, U.S. Letters Pat. No. 4,422,329 filed May 17, 1982, granted Dec. 27, 1983 and other U.S. Pat. Document references cited therein. Other references cited are as follows:

| References Cited U.S. Pat. DOCUMENTS | | | | |
|---|---|---|---|---|
| Document No: | Date: | Name: | Class: | Sub-Class: |
| A. 4,422,429 | 12/27/83 | Reed | 123 | 557 |
| B. 4,594,991 | 6/17/86 | Harvey | 123 | 557 |
| C. 4,368,716 | 1/18/83 | Davis | 123 | 557 |
| D. 4,883,040 | 11/28/89 | Rocky | 123 | 557 |
| E. 4,442,819 | 4/17/84 | Veach | 123 | 557 |
| F. 4,611,567 | 9/16/86 | Covey | 123 | 557 |
| G. 4,846,137 | 7/11/89 | Ray | 123 | 557 |
| H. 4,926,830 | 5/22/90 | McNelley | 123 | 557 |

SUMMARY OF THE INVENTION

The combustion emission reduction device of the instant invention includes a noncontinuous and noncontiguous inlet and outlet central fuel passage and first, second and third annular concentric chambers disposed about the fuel passage with the first chamber being in communication with the inlet and outlet fuel passages and with no communication between the second chamber and the first chamber and between the third chamber and the second chamber and a pressure relief valve in a separate passage external to the third outer chamber joining the two noncontinuous parts of the inlet and outlet central fuel passages outside of the first, second and third chambers. The second chamber includes air (and/or other cooling source) inlet and outlet structures whereby a portion of induction air of the associated engine and/or other cooling source may be drawn through the second chamber. In many applications, this vacuum air and/or other cooling source need not be pushed or pulled through chamber two with little or no side effects on the performance of the instant invention. In these cases, simply having chamber two present with its heat is sufficient. However, in other more critical cases, it must be connected to an outside cooling source. The third chamber includes liquid coolant (and/or other energy source) inlet and outlet passages whereby a portion of the engine coolant and/or some other energy source may pass through the third chamber.

While the immediate patent application is centered upon and illustrates usage with a water-cooled internal combustion engine and/or gas or liquid fueled combustion processes, it applications are many and varied, and not limited thereto.

The interior fuel inlet passage is perforated within the cylinder walls of the first chamber and communicates with the first chamber. Within the first chamber, a fourth chamber is disposed about the outermost portion of the perforated interior fuel outlet passage, and that portion of the interior fuel outlet passage within the fourth chamber does not communicated directly with the first chamber. The interior fuel outlet passage situated above and outside of the walls of the fourth chamber is also perforated except at the "J" Device and does communicate with the first chamber The perforated interior fuel inlet and outlet passages are situated vertically parallel to each other within the first chamber. The interior fuel inlet passage and the interior fuel outlet passage are each blocked at their innermost ends inside the first chamber, necessitating the flow of fuel from the perforated interior fuel inlet passage into and through the first chamber, thence out of the first chamber through the perforated interior fuel outlet passage as it passes above and through the fourth chamber. The fuel inlet and outlet passages outside of the walls of the first chamber are not perforated.

The second chamber includes manifold vacuum air inlet and outlet passages extending from the outer walls of the second chamber through and out of the third chamber end walls.

The third chamber outer walls are also penetrated by an engine coolant inlet passage and by an engine coolant outlet passage which allows engine coolant into and out of the third chamber in a continuous circulatory manner. These third chamber inlet and outlet passages are situated parallel to each other longitudinally on opposite ends of the third chamber cylinder walls. The placement of the third chamber inlet and outlet passages are such that flow within the third chamber is intentionally directed in a rapid circular motion around the central fuel passage.

In addition, depending upon the specific application of the instant invention, opposite side magnets may or may not be mounted along the wall portions of the body separating the first and second chambers of the device.

Energy to process the fuel is brought to the invention by engine coolant entering and exiting the third chamber through said engine coolant passages. The heating capacity of the third chamber, in some applications, is modulated by manifold vacuum air passing through the second chamber, otherwise the second chamber air space itself serves to modulate the heat source. The first chamber surrounding the fuel inlet and outlet passages serves to further modulate the temperature of the fuel passing through the central fuel inlet and outlet passages. The unique combination of forces upon the fuel created by the hollow, perforated, non-continuous and non-contiguous inlet and outlet fuel passages, pressure, turbulent flow, temperature, retention time, and in some cases magnetism, perhaps forces unnamed and the application of energy within the first chamber results in a process that alters the fuel prior to combustion which results in the desired emissions reductions and fuel efficiency described herein.

The main object of this invention is to provide an emission reduction device to treat incoming fuel for a combustion engine or a combustion process which utilizes engine coolant and/or other regulated energy source as a heating source and which therefore has a substantially constant amount of energy supplied to the emission reduction device after operating temperatures of the associated engine and/or other regulated external energy source have been reached.

Another object of this invention is to provide an emission reduction device in accordance with the preceding object and including structure operative to reduce overall emissions of harmful gaseous and particulate matter otherwise created during combustion.

Yet another important object of this invention is to provide a combustion emission reduction device constructed in a manner whereby the internal temperature of the instant invention may be modulated as a result of external regulators or, in some applications, as a result of insulation in the form of engine induction air (and/or other acceptable external cooling source) passing between the liquid engine coolant (and/or other energy source) heating surfaces of the emission reduction device and the wall portions of the passage of the device through which the fuel to be treated passes.

Another object of this invention is to provide an emission reduction device which, other than being supplied with a regulated flow of energy to the third chamber and in some applications coolant to the second chamber, is self-contained and self-regulating and does not require any external controls.

Another object of this invention is to, in some applications, actually reduce emissions and fuel consumption simultaneously.

A final object of this invention to be specifically enumerated herein is to provide an emission control device in accordance with the preceding objects and which will conform to conventional forms of manufacture, be of simple construction and automatic in operation, so as to provide a device that will be economically feasible, long lasting, safe and relatively trouble-free.

These together with other objects and advantages which will become subsequently apparent reside in the details of construction and operation as more fully hereinafter described and claimed, reference being had to the accompanying drawings forming a part hereof, wherein like numerals refer to the like parts throughout.

BRIEF DESCRIPTION OF THE DRAWINGS

FIG. 18 is a cross sectional view of an alternative embodiment of the present invention.

DETAILED DESCRIPTION OF THE INVENTION

While the immediate patent application is centered upon and illustrates usage with a gasoline-powered, water-cooled, internal combustion engine and/or gas or liquid fueled combustion processes, its applications are many and varied, and are not limited thereto.

Figure 1:
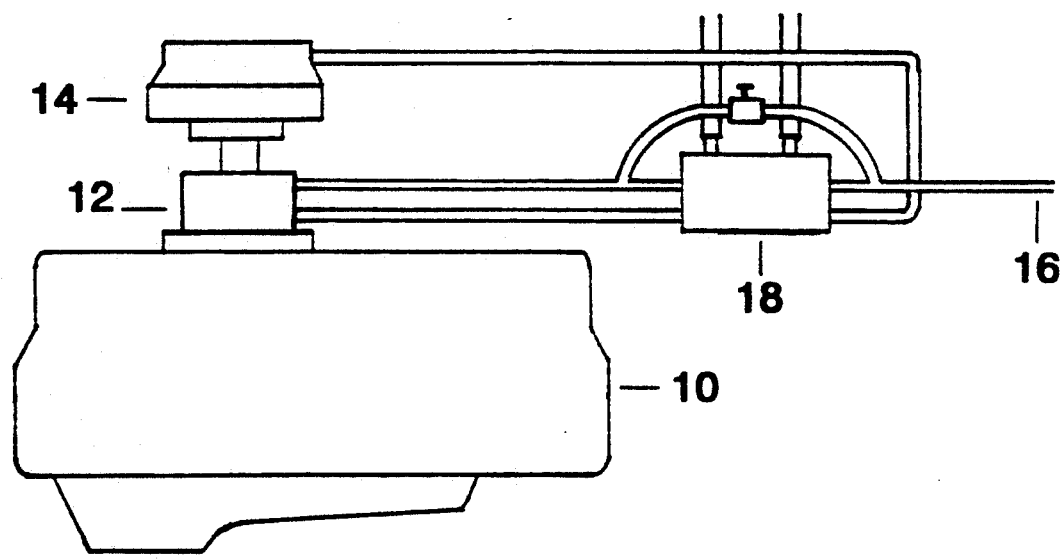
FIG. 1 is a schematic view of a typical gasoline powered, watercooled, internal combustion engine with which the emission reduction device of the instant invention may be operatively associated.
Figure 2:
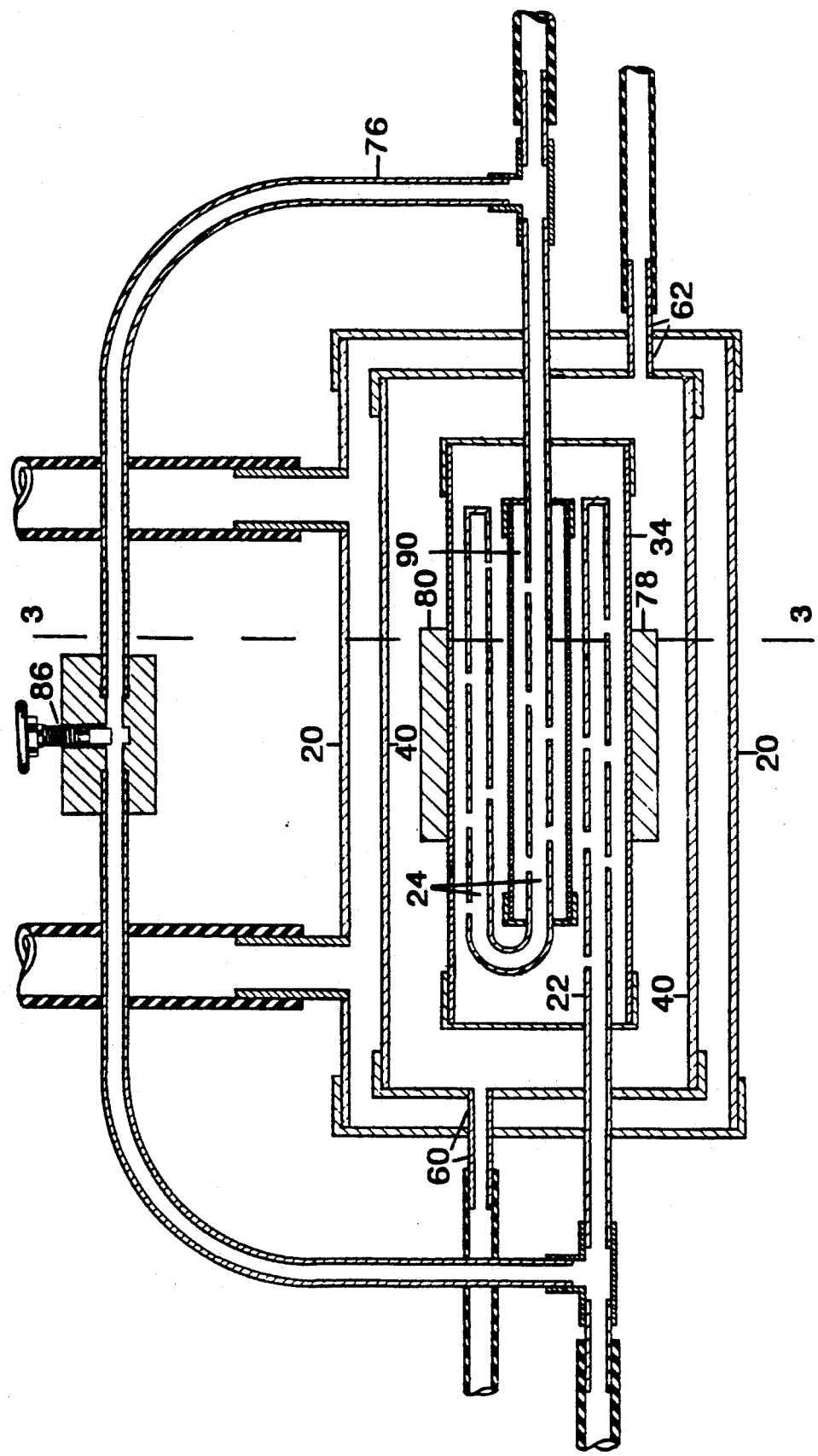
FIG. 2 is an reduced longitudinal vertical sectional view of the emission reduction device shown in more detail on FIG. 7.
Figure 3:
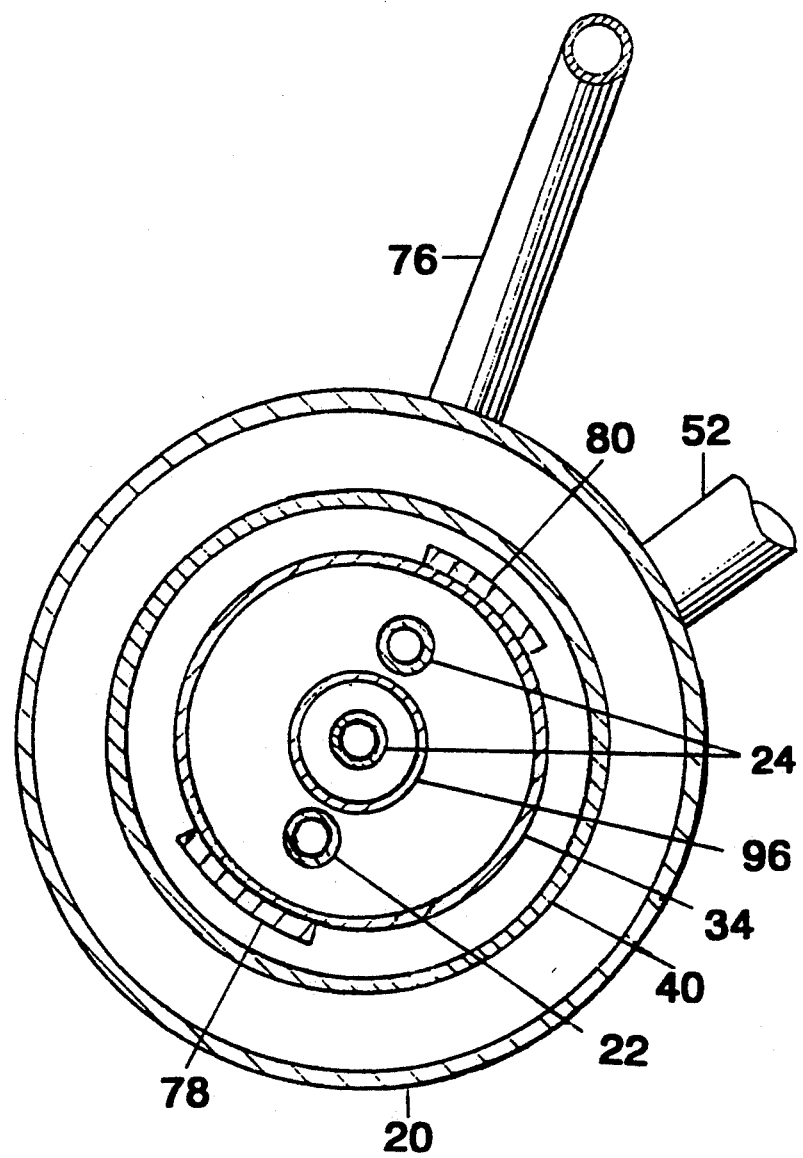
FIG. 3 is a transverse vertical sectional view on somewhat of an enlarged scale, taken substantially upon the plane indicated by the section line 3—3 on FIG. 2.

Referring now more specifically to the drawings, in FIG. 1, the numeral 10 generally designates a conventional form of a gasoline powered, water-cooled internal combustion engine including a carburetor 12 having an air cleaner 14 mounted thereon Engine 10 has a fuel line 16 leading from a fuel pump (not shown) to carburetor 12. Further, the engine 10 has a conventional radiator (not shown) operatively associated therewith and also includes a thermostat (not shown) for controlling the flow of engine coolant through the engine 10 and/or regulating the water temperature inside the engine 10. Engine 10 is one application of the instant invention 18 and is used for illustrative purposes herein. The application of the instant invention is not intended to be limited to internal combustion engines thereto, but it is acknowledged that the water cooled and air cooled internal combustion engine represents the greatest immediate need for the instant invention, and by far, the greatest numbers for its practical application. The instant invention is specifically applicable to diesel, turbocharged and fuel injected engines also, but again is not limited thereto.

Figure 7:
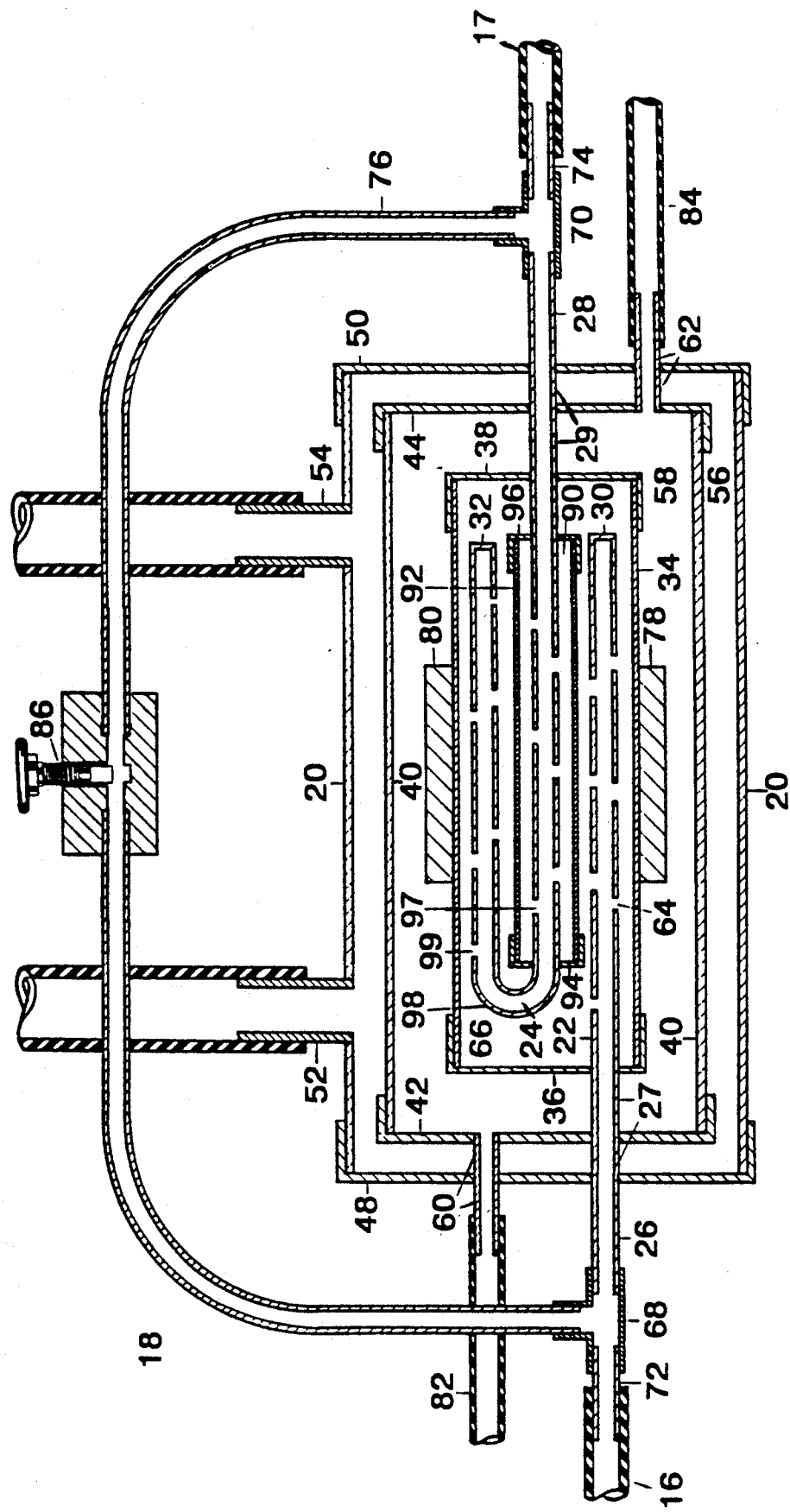
FIG. 7 is a cross sectional view of an alternative embodiment of the present invention.

The combustion emission reduction device of the instant invention is referred to in FIG. 7 in general and in total by the reference numeral 18 and defines an elongated hollow cylindrical body 20 (outer walls of third chamber). The body 20 includes a pair of non-continuous and non-contiguous fuel inlet and outlet passages, reference numerals 22, 26, 27 and 72 (22/26/27/72) and reference numerals 24, 28, 29, 74 and 98 (24/28/29/74/98) respectively The fuel inlet and outlet passages are parallel, with the fuel outlet passage 24 being situated directly above the fuel inlet passage 22. The interior fuel inlet passage 22 terminates within the first chamber 66 and is closed at its innermost end 30. The interior fuel inlet passage 22 communicates with the first chamber 66 through perforations 64. The interior fuel outlet passage 24 is partially enclosed by a fourth chamber 90 formed by cylindrical housing 92 and end walls 94 and 96. Within the fourth chamber 90, the interior fuel outlet passage 24 contains perforations 97 and communicates with the fourth chamber. This fourth chamber 90 functions as an anti-vaporlock device A "J" shaped passage 98 extends from the end of the fourth chamber extending the interior fuel outlet passage 24 above the fourth chamber 90. This "J" shaped passage 98 curves up over end wall 94 allowing the interior fuel outlet passage to run parallel to the top of the fourth chamber housing 92. This "J" shaped interior fuel outlet passage outside of the fourth chamber is closed at its innermost end 32 and contains perforations 99 in multiple directions along its length which allow communication with the first chamber 66. Within the first chamber 66, through the use of applied energy and turbulence, the fuel is processed (altered) prior to combustion to achieve the desired emissions reductions described herein. The portions of the fuel inlet and outlet passages situated outside the walls of the first chamber 34 but within the walls of the second chamber 58 and third chamber 56 are numbered 27 and 29, respectively. They are not perforated and are sealed off from chambers 58 and 56, and serve only to traverse through them That portion of the fuel inlet and outlet passages situated outside the walls of the third chamber 56 have been numbered 26 and 28 respectively, and are not perforated.

The interior fuel inlet and outlet passages 22 and 24, including that portion of the interior fuel outlet passage enclosed within the fourth chamber 90, are enclosed within the first chamber 66 by cylindrical housing 34 (outer walls of first chamber) and opposite end walls 36 and 38, through which the inlet and outlet passages 27 and 29 extend. The housing 34 is enclosed within a second cylindrical housing 40 (outer walls of second chamber) substantially concentric with the housing 34 and including end walls 42 and 44 through which the fuel inlet and outlet passages 27 and 29 extend. Finally, a third outer cylindrical housing 20 is disposed about the housing 40 in a substantially concentric manner and includes end walls 48 and 50 through which the inlet and outlet end portions 26 and 28 extend.

The outer housing 20 includes inlet and outlet liquid engine coolant passages 52 and 54 through which liquid engine coolant from the engine 10 enter and exit from the third chamber 56 in a continuous circulatory manner The liquid engine coolant inlet and outlet passages are situated parallel to each other longitudinally on opposite ends of the third chamber outer wall 20 The placement of the inlet and outlet passages is such that they intentionally direct engine coolant in a rapid circular motion around the central fuel passage. Energy to process the fuel is brought to the instant invention by liquid engine coolant entering and exiting the third chamber through said engine coolant passages, 52 and 54. to a manifold vacuum air source. In many applications, the presence of air within the second chamber 58, even if not connected to an external cooling source has a sufficient enough cooling effect. The inlet and outlet manifold vacuum air passages 60 and 62 allow heat to escape if unconnected and in many applications the exactness of the regulated external heat source into the third chamber 56 is sufficient enough, even without the external cooling of manifold vacuum air, to allow the instant invention to function properly and within its temperature range of effectiveness.

It is noted that the inlet liquid engine coolant passage 52 will be appropriately connected to the liquid coolant passages (heater hoses) of the engine 10 and that the liquid engine coolant outlet passage 54 will also be similarly connected to the coolant passages of the engine 10 thereof in a manner such that during operation of the engine 10 liquid coolant will continuously pass through the third outer chamber 56 disposed between the housings 20 and 40. In addition, in certain applications, the inlet 60 may be operatively connected to the air filter 14 and the outlet 62 may be operatively connected to a vacuum port on the carburetor 12 (or by a substitute configuration) in order that a portion of the induction air will pass through the intermediate chamber 58 during operation of the engine 10.

Fuel inlet and outlet passages 26 and 28 are disposed exteriorly of the body 20 and are connected to T-shaped hollow fittings 68 and 70, which are in turn connected to passages 72 and 74 onto which the fuel line is fitted. Passages 72 and 74 are merely extensions of 26 and 28 outside of the T-shaped fittings 68 and 70. Connected in a roughly semi-circular manner between the vertical arms of the T-shaped fittings 68 and 70 and fitted into same is an open and hollow crossover passage 76 which serves as a bypass pressure relief. The heating capacity of the third chamber, in some applications, is modulated by manifold vacuum air passing through the second chamber 58. In applications where manifold vacuum air is not passed through the second chamber 58, the air space within the second chamber 58 serves to modulate the heat source but to a lesser extent. In addition to processing the fuel, the first chamber 66 which surrounds the fuel inlet passage 22 and the fuel outlet passage 24 serves to further modulate the temperature of the fuel passing through the interior fuel inlet and outlet passages within the first chamber 66.

It should be noted that in liquid cooled internal combustion engines the regulation of the heat of the liquid coolant takes place as a normal operating function of the engine and no prior heat source regulation need take place in these instances before water enters the instant invention. The intermediate housing 40 includes an interior annular space 58 (second chamber) between the intermediate housing 40 and the inner housing 34 and includes inlet passage 60 and an outlet passage 62 through which a portion of the manifold vacuum air, induction air, for the engine 10 may enter and exit from the interior of the housing 40. The inlet passage 60 and outlet passage 62 pass through the end walls 48 and 50 of the outer housing 20, but are not in communication with interior annular space 56 (third chamber) as they pass through same. Inlet and outlet passages 60 and 62, depending on various applications, may or may not be actually connected to manifold vacuum air, engine induction air, but are always built into the invention in case an application requires their use and because of the cooling/modulating effect annular space 58 (the second chamber) has on the first chamber 34, even when not connected valve. An adjustable valve 86 is positioned in passage 76 to regulate any volumes of fuel which may be temporarily bypassing the central fuel passage In many various applications of the instant invention, the adjustable valve 86 may not be necessary in order to achieve optimum emission reductions and performance. In the event of a pressure build-up within the internal portions of the instant invention, fuel will momentarily be forced through the bypass pressure relief valve 76 for several seconds until pressure is relieved Fuel will then flow again through the body of the device where treatment is resumed.

Onto diametrically opposite outer sides of the housing 34 (depending on the application) are attached elongated bar magnets 78 and 80 mounted thereon which are arcuate in transverse cross section and thereby somewhat conform to the outer curvature of the housing 34. The bar magnets are mounted with their north and south magnetic poles situated opposite each other The bar magnets 78 and 80, when installed, are thus disposed in the chamber 58. Depending upon the specific application of the instant invention, the opposite side bar magnets may or may not be included in the instant invention.

Further, interior fuel inlet and outlet passages 22 and 24 includes perforations 64 whereby communication between interior fuel inlet passage 22 and chamber 66 and between chamber 66 and interior fuel outlet passage 24 is provided. Chamber 66 is that intermediate area within the walls of the first chamber 34 but outside of the walls of interior fuel inlet passage 22 and outside of the walls of the fourth chamber and the interior fuel outlet passage 24 as they are situated within chamber 34.

In operation, the emission reduction device 18 is installed by serially connecting the fuel inlet passage 72 into the existing fuel line 16 exiting the fuel pump and by connecting the fuel outlet passage 74 into the existing fuel line 17 leading to the carburetor of the engine 10 and, depending on the proposed use, by serially connecting the inlet manifold vacuum air passage 60 and the outlet manifold vacuum air passage 62 of the second chamber 58 into a vacuum line 82 and 84 extending between the air cleaner 14 and a vacuum port of the carburetor 112. To function, the bypass pressure relief valve 76 must be mounted above the elevation of the central fuel passages 22/26/27/72 and 24/28/29/74/98. Additionally, the instant invention works best when mounted in such a way that the central fuel passages are in a roughly horizontal position. Also, the liquid engine coolant inlet passage 52 may be connected to the heater hose extending to the associated vehicle heater through the utilization of a T-fitting and an additional length of heater hose leading to passage 52. The outlet liquid engine coolant passage 54 may be connected to the heater hose extending from the heater to the engine through the utilization of a second T-fitting, and another length of heater hose leading to passage 54, bypassing the heater control valve 3, allowing for continuous circulation at all times. Further applications for installations using alternative energy sources and/or different combustion chambers would require different methods of installation of the instant invention and the illustrative use of the instant invention with water-cooled internal combustion engine 10 is not meant to limit any possible additional applications. It is necessary under most operating conditions to provide a continuous flow of liquid engine coolant, entering through passage 52 circulating in chamber 56 around chamber wall 40 (second chamber outer wall) and exiting through passage 54, using regulated energy sources into chamber 56 to insure the control of temperatures within device 18. In the water-cooled internal combustion engine, the temperature is regulated by the engine's individual cooling system controls to prevent overheating of the engine 10 itself, (i.e. the radiator, water pump, engine coolant and thermostat).

As heated liquid engine coolant from the engine 10 passes through the third chamber 56, the housing 40 (outer wall of second chamber) is heated and the heated housing 40 (second chamber) functions to heat the housing 34 (outer wall of first chamber) by radiant heat. This regulated energy source to chamber 56 and the optional flow of a portion of the induction air or other cooling source through the chamber 58 and or chamber 58 itself modulates the amount of heating of the housing 34, which in turn heats the first chamber 66, the fourth chamber 90, interior fuel inlet passage 22 and the interior fuel outlet passage 24. Thus, the fuel flowing through the interior passages 22 and 24 is treated under heat. The perforations, ports or bores 64 enable fuel to communicate between interior fuel inlet passage 22 and the inner chamber 66 and between the inner chamber 66 and interior fuel outlet passage 24. Because of the modulating effect of heating of the housing 34 by a portion of the induction air passing through the chamber 58, and in some applications, simply the presence of chamber 58, excessive heating of fuel passing through the central portion 66 is avoided. The magnets 78 and 80 serve to trap ferrous impurities flowing to the heater 18 through the passages 22 and 24 and also, apparently, have an effect on the fuel passing through the heater 18 to the carburetor 12 to enhance the ability of the fuel to be vaporized by the carburetor 12. When the bar magnet's fields are diametrically opposite each other (north-/south) the repelling magnetic forces of opposite magnetic poles tends to create an additional and unique source of turbulence and/or additional unique forces applied to the fuel stream which aid in the process of reducing harmful emissions created during combustion. In many applications, the additional forces of the magnets are not necessary to achieve optimal emissions reductions. The combination of turbulence, flow, pressure, diversion, retention time, temperature, in some cases magnetism, and perhaps forces unnamed combine in chamber 66 within the first chamber to process and-/or treat the fuel for a cleaner combustion emitting substantially less harmful emissions such as un-burned hydrocarbons and particulates.

It should be noted that the actual treatment process takes place under heat in the first chamber 34. However, the instant invention is not designed to be nor does it work as a fuel heater in this particular set of circumstances. During the fuel transformation process in the instant invention, the fuel is first heated, but, then its temperature is rapidly reduced within the device and fuel exits at essentially the same temperature at which it entered.

Chambers 56 and 58 serve as an efficient and effective way to use properties already available in certain combustion processes to help effectuate the treatment process in the first chamber In the event of other controlled energy sources, such as electric heat coils, electronic heaters, or any other adaptableheat sources to the first chamber 66, it is conceivable that either the third chamber 56 or the second chamber 58, or both, could be eliminated or that other chambers may be added in the instant invention without reducing its effectiveness It is not the intent of this application for patent to limit the sources of heat to the first chamber 66 or to require (without variation) the use of the third chamber 56 and the second chamber 58 in order to achieve acceptable fuel treatment in the first chamber 34.

Figure 4:
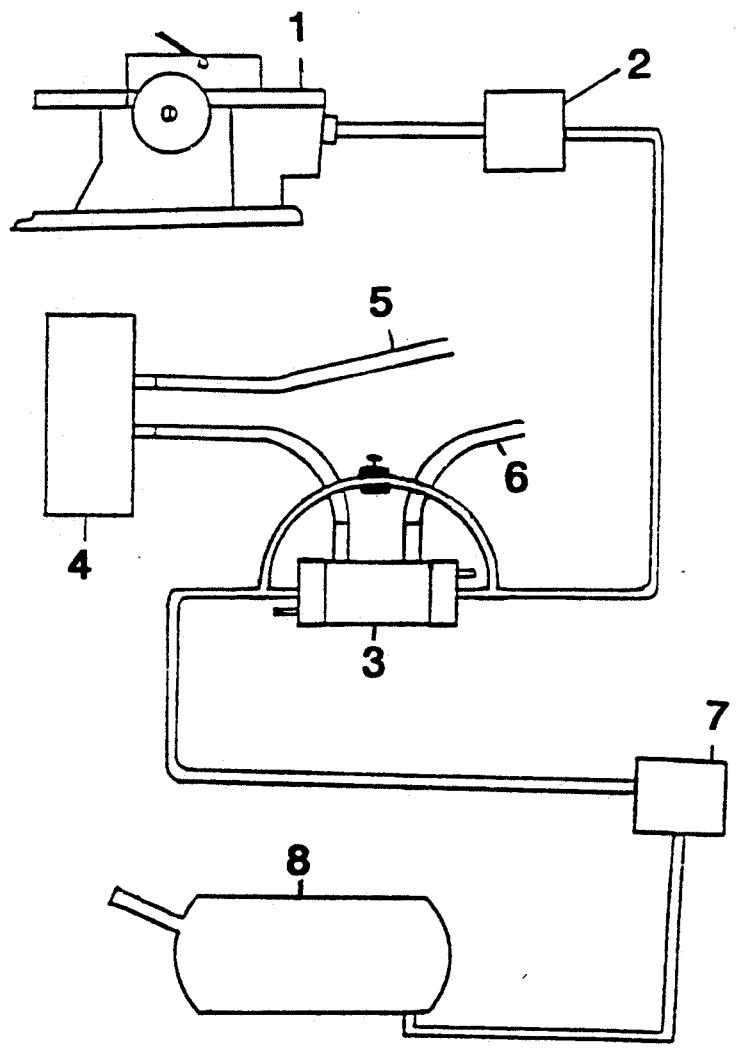
FIG. 4 is a schematic view of a typical gasoline powered, watercooled, internal combustion engine showing the combustion emission reduction device and how it is positioned with regard to the engine's fuel system and cooling system.
Figure 5:
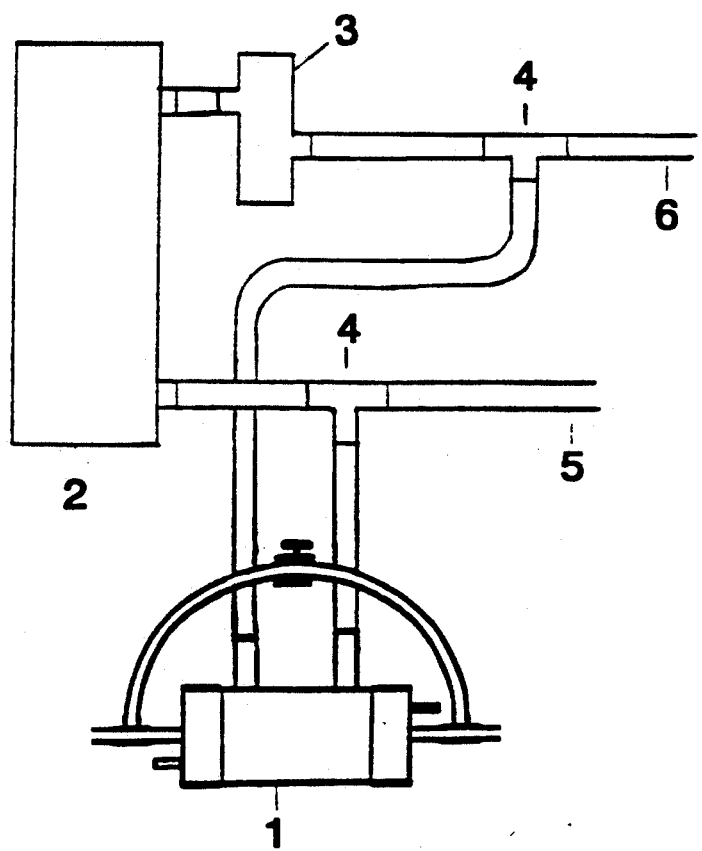
FIG. 5 is an enlarged view of the means by which the combustion emission reduction device is associated with the watercooled internal combustion engine cooling system.
Figure 6:
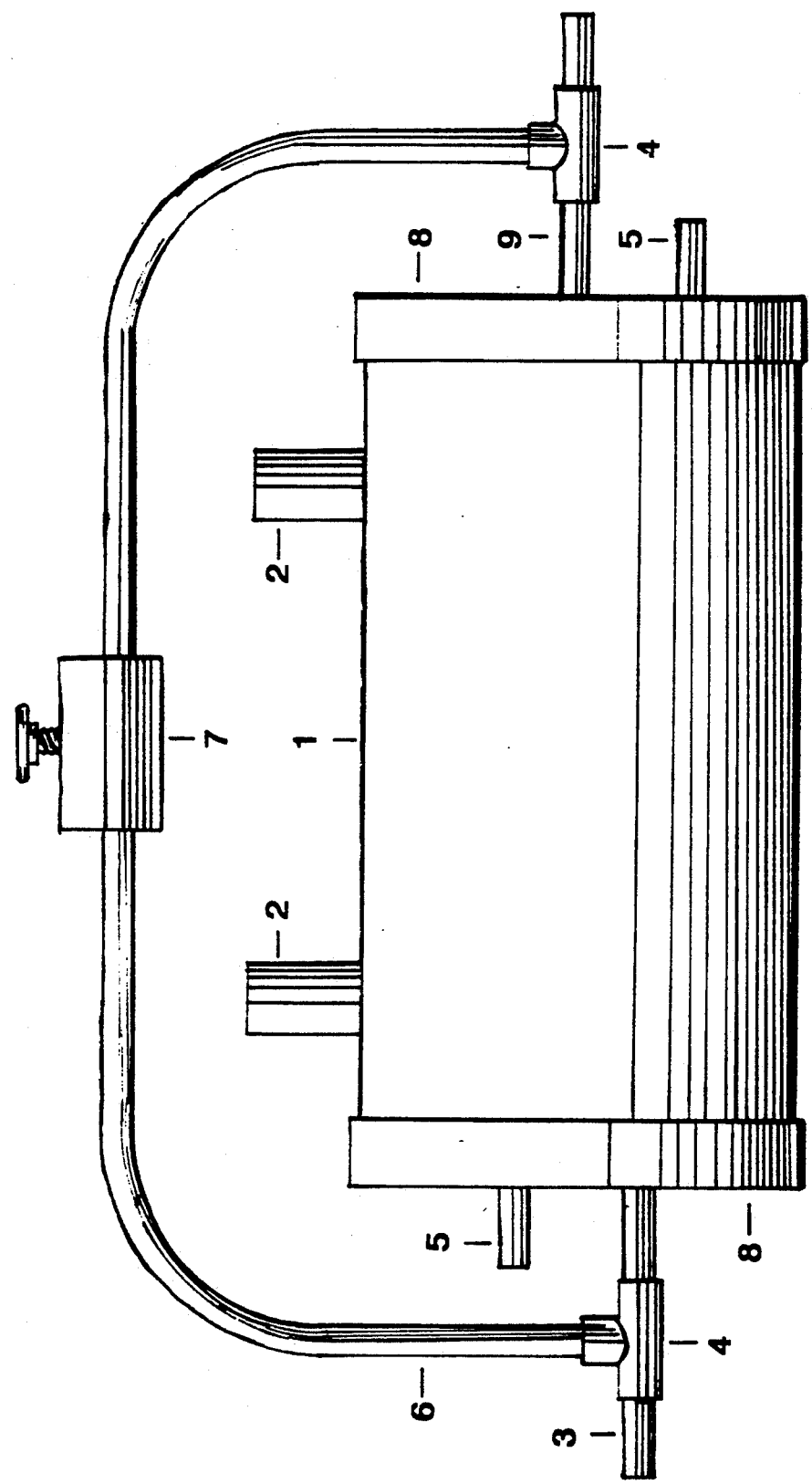
FIG. 6 is an enlarged external, longitudinal view of the combustion emission reduction device.

In regard to FIG. 4, an illustration is made of the location of the instant invention as mounted to a typical internal combustion engine 10. From the fuel tank 8, the fuel is picked up by fuel pump 7 where it is injected under pressure into the combustion emission reduction device 3, then out through the fuel filter 2 and injected into the carburetor 1. The heated engine coolant flows from the engine 10 through the heater hose intake line 6 into the combustion emission reduction device 3 and out through the heater hose outflow line to the water pump 5. The heater core 4 may be bypassed through the use of "T" fittings to insure a constant flow of heated engine coolant through the instant invention.

Figure 8:
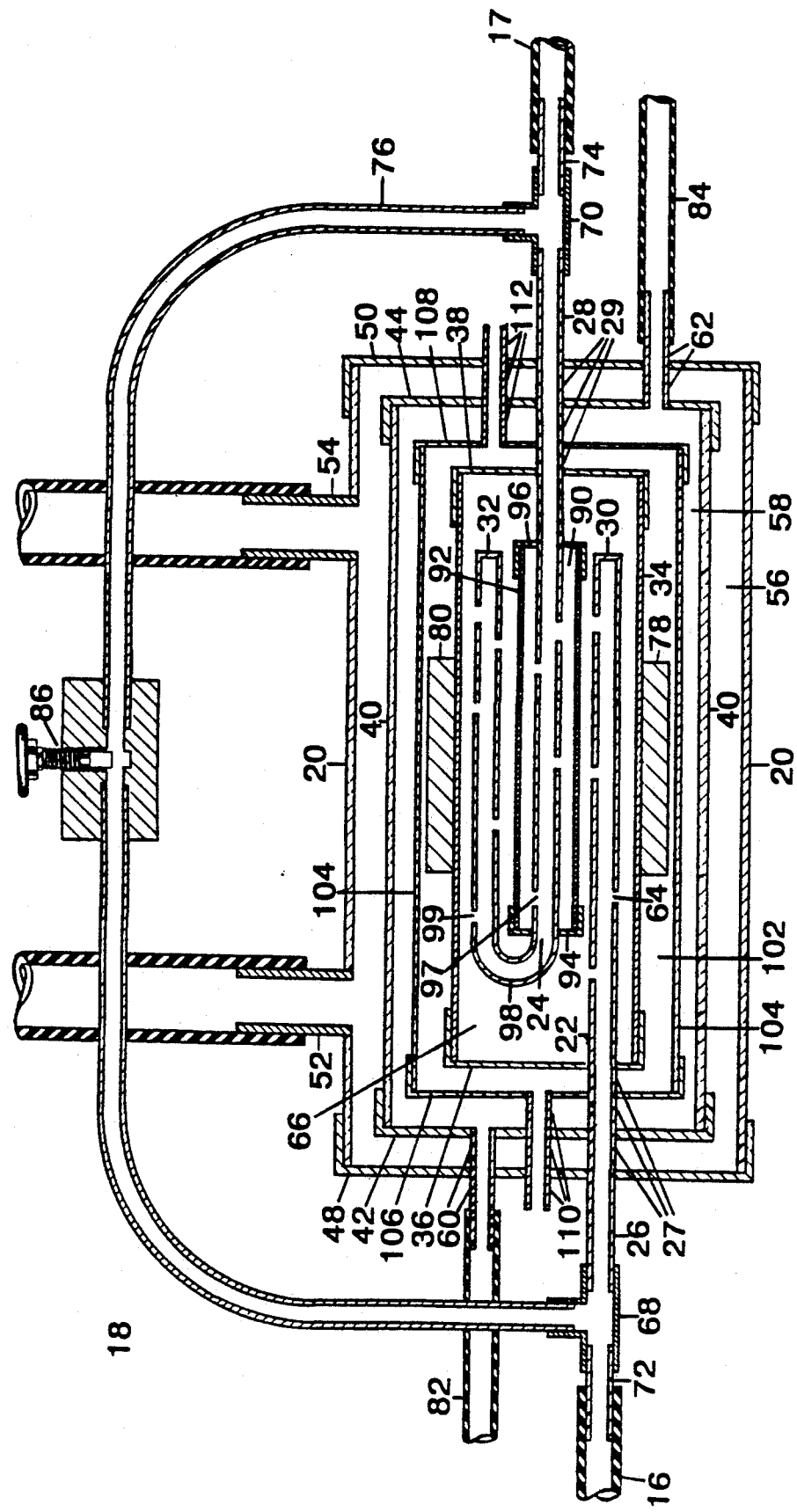
FIG. 8 is a cross sectional view of an alternative embodiment of the present invention.
Figure 9:
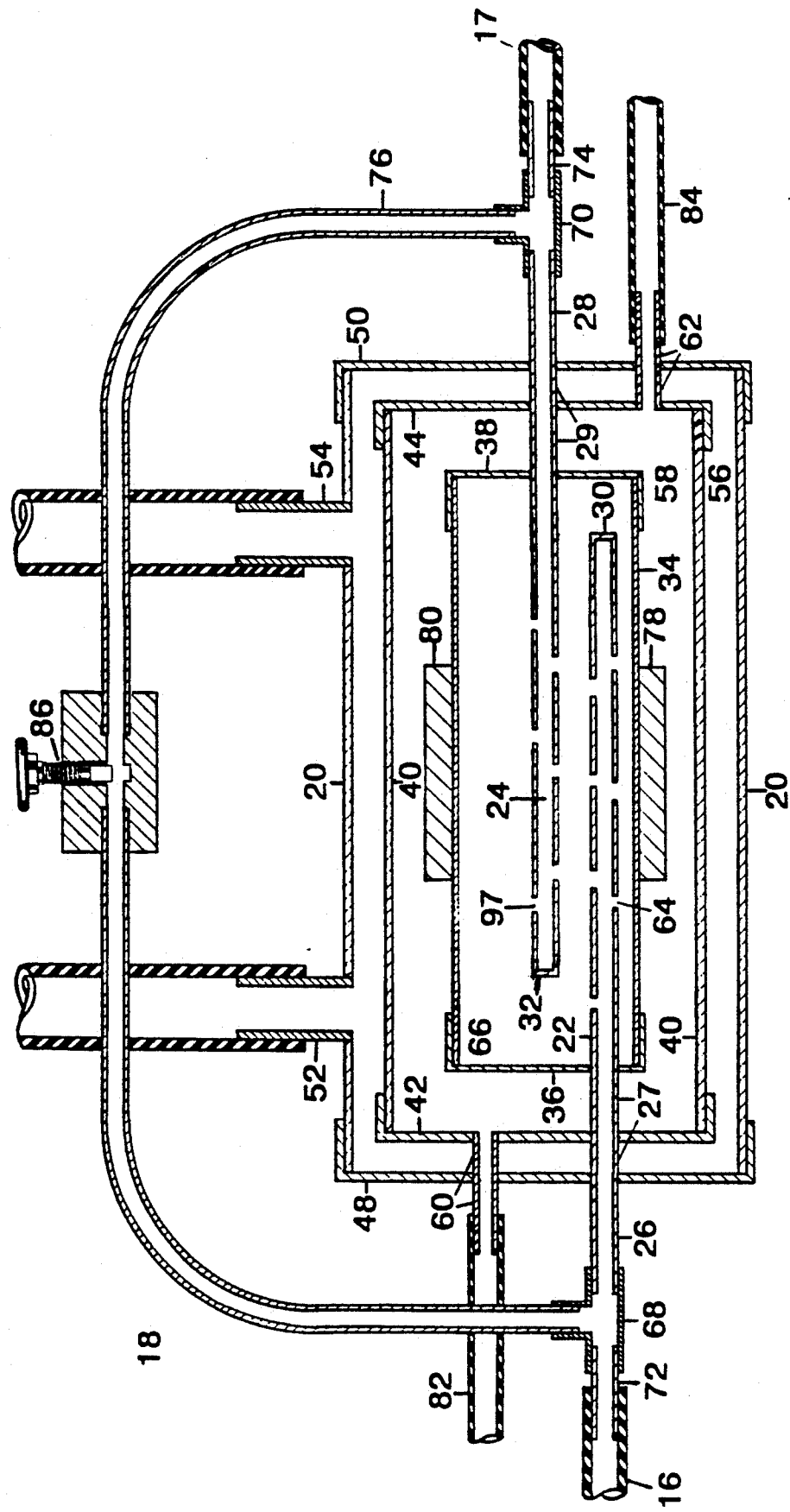
FIG. 9 is a cross sectional view of an alternative embodiment of the present invention.
Figure 10:
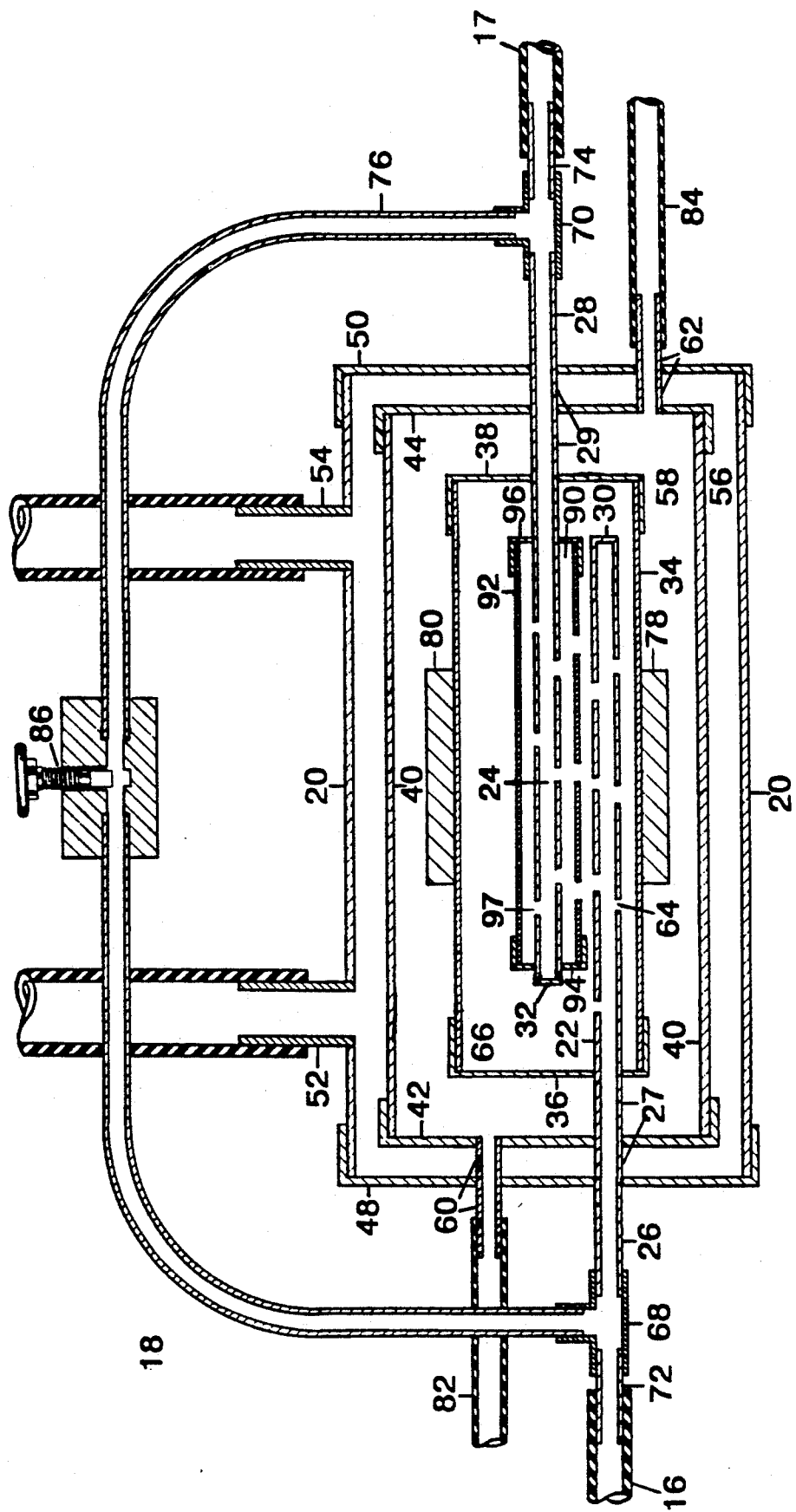
FIG. 10 is a cross sectional view of an alternative embodiment of the present invention.
Figure 11:
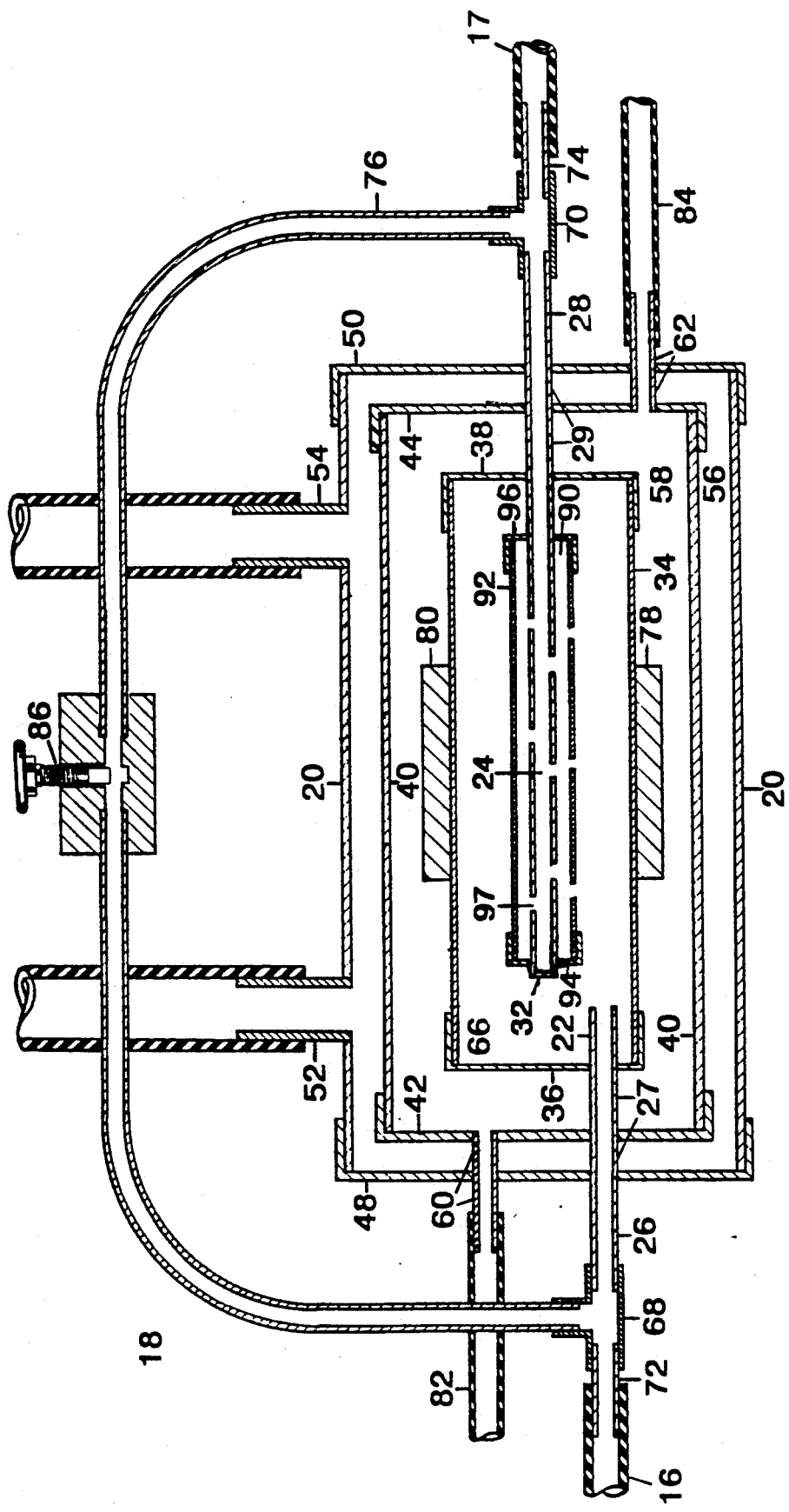
FIG. 11 is a cross sectional view of an alternative embodiment of the present invention.
Figure 12:
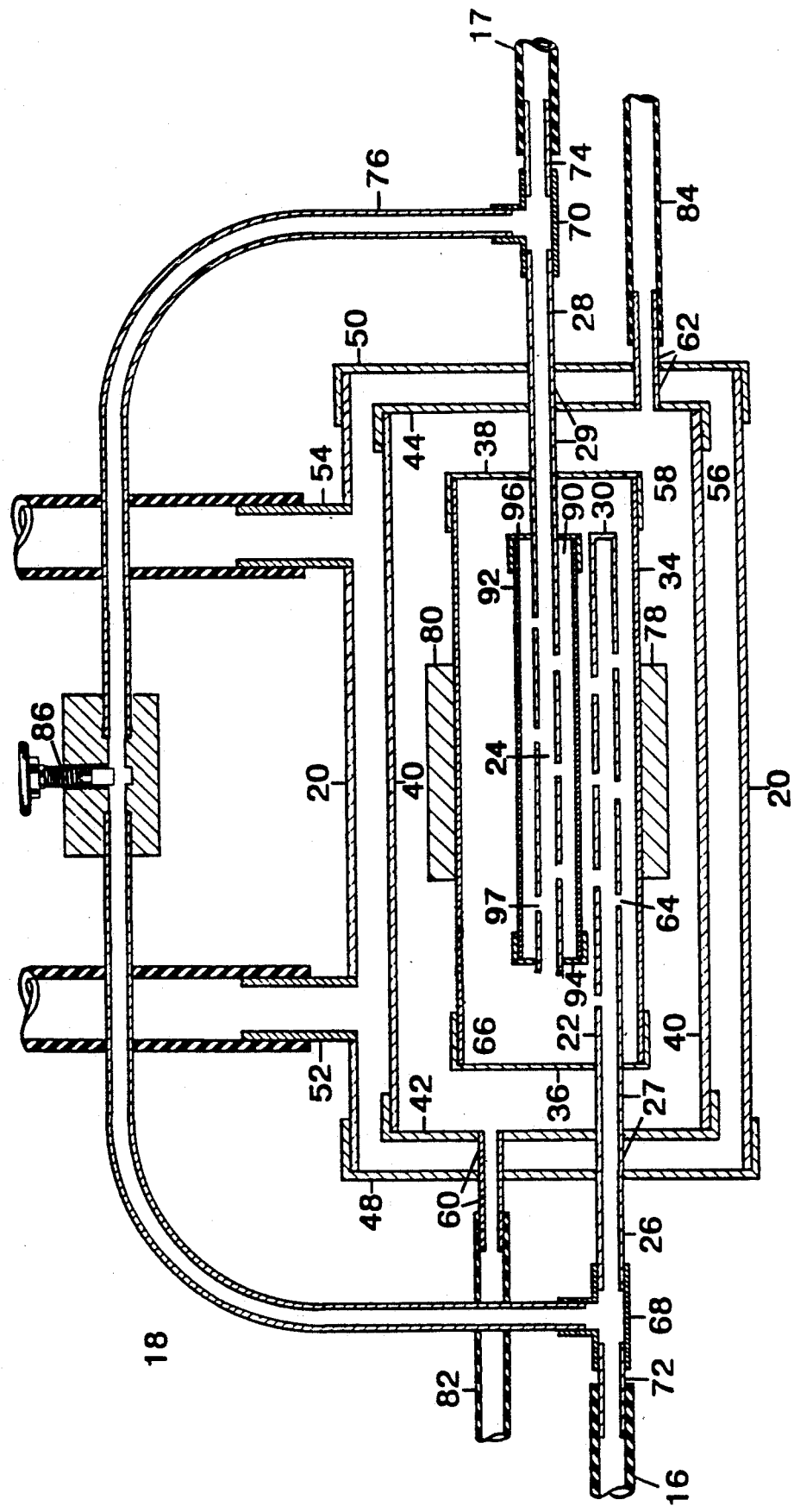
FIG. 12 is a cross sectional view of an alternative embodiment of the present invention.
Figure 13:
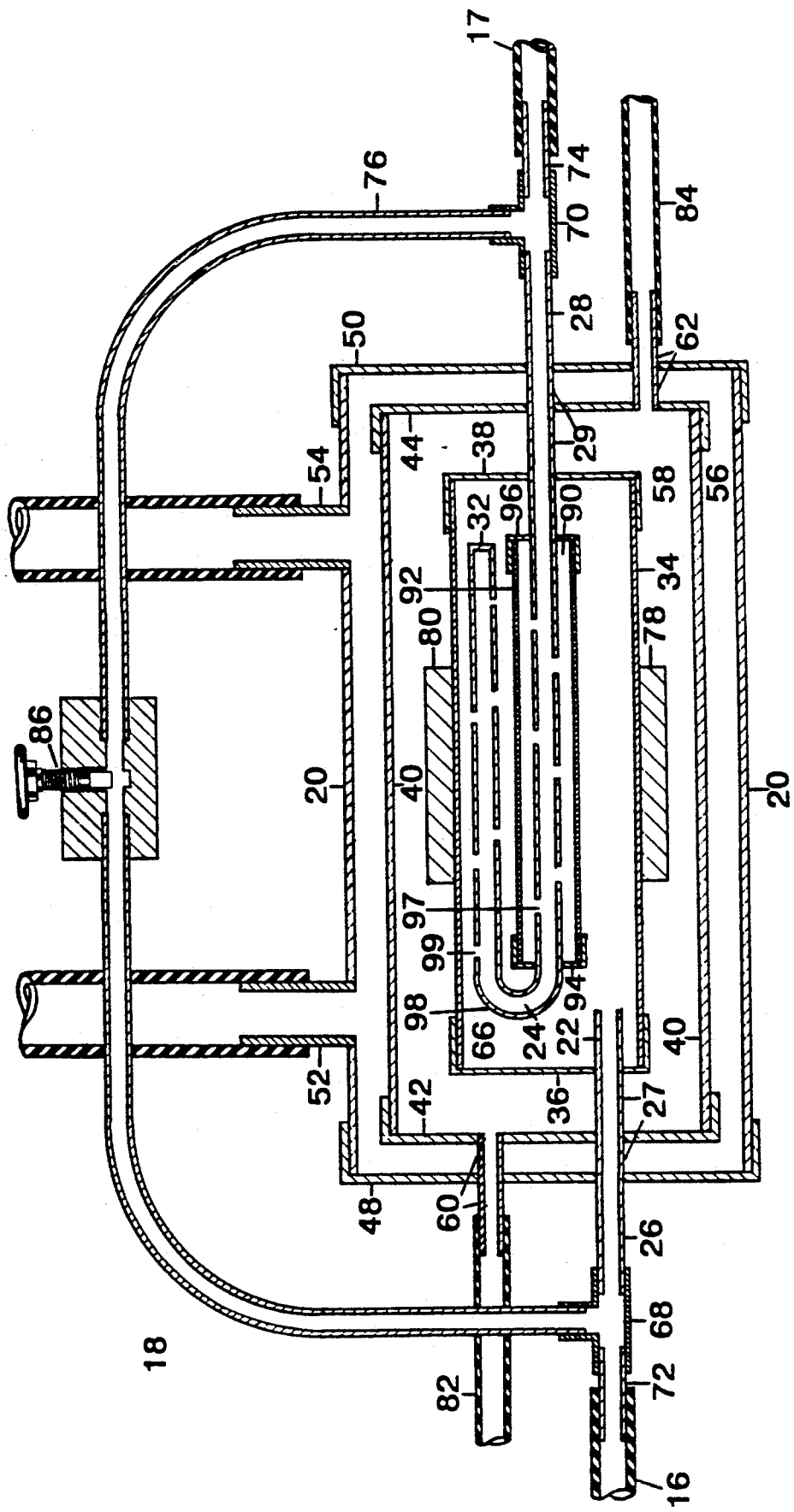
FIG. 13 is a cross sectional view of an alternative embodiment of the present invention.
Figure 14:
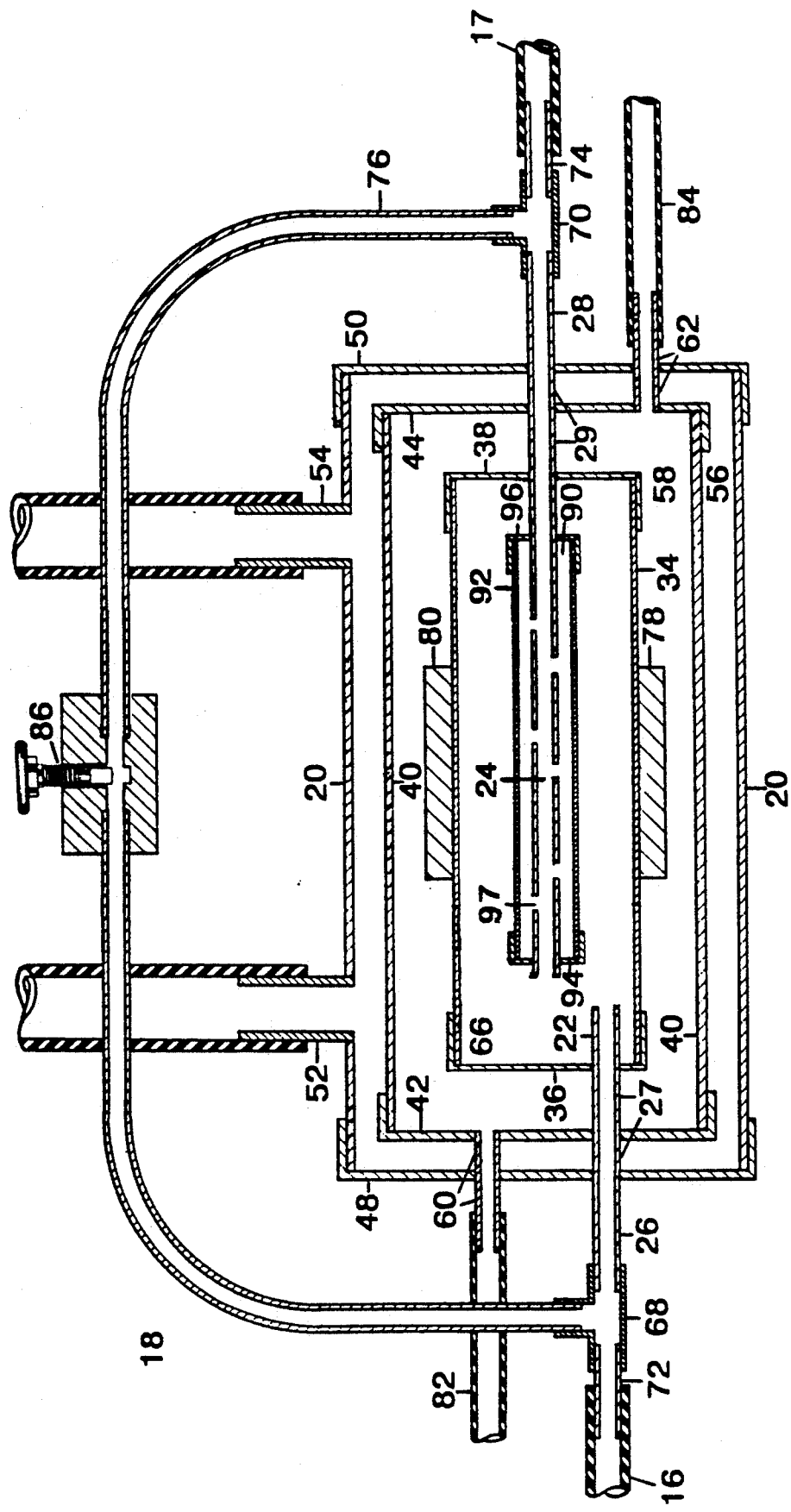
FIG. 14 is a cross sectional view of an alternative embodiment of the present invention.
Figure 15:
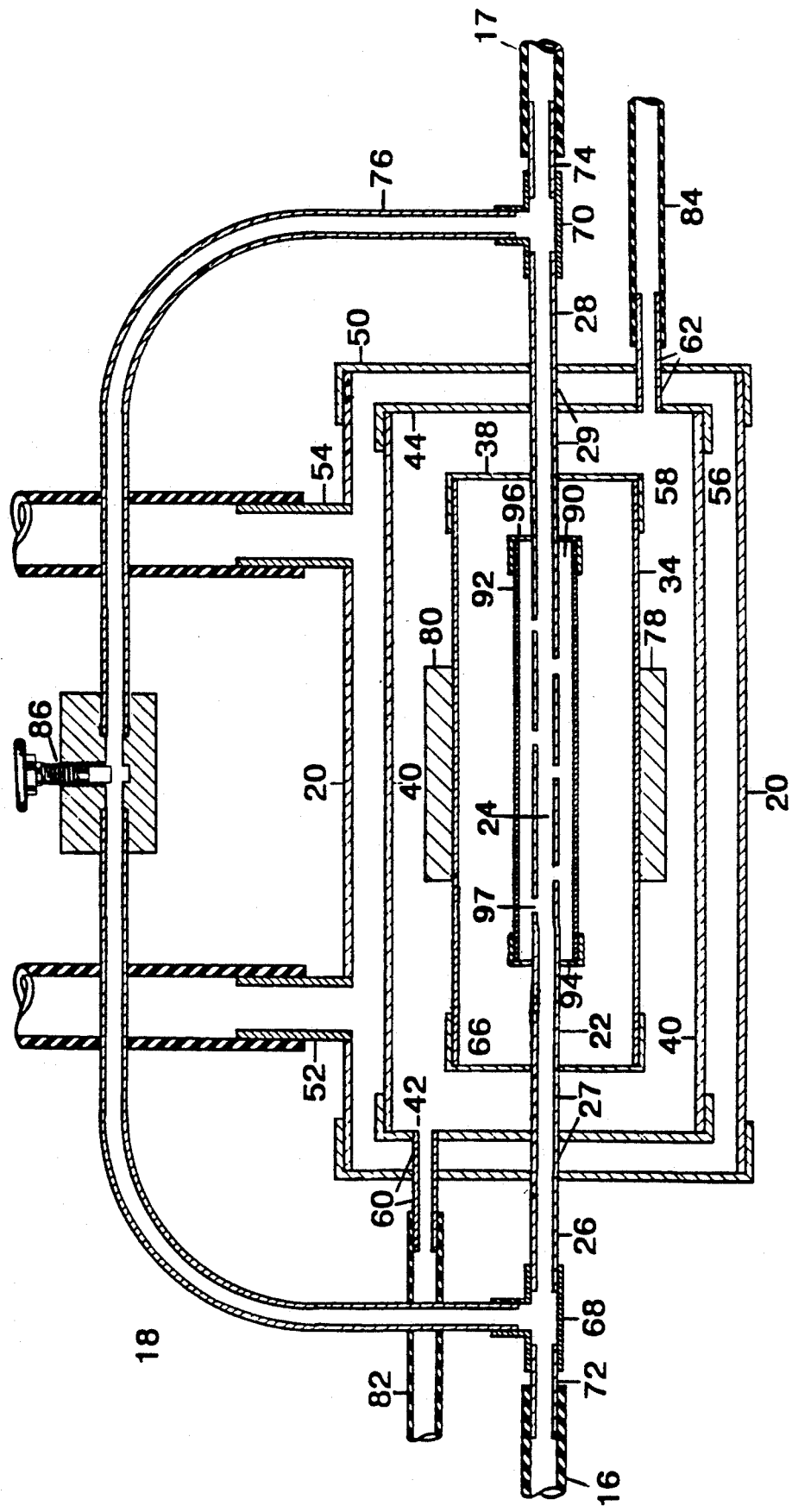
FIG. 15 is a cross sectional view of an alternative embodiment of the present invention.

In another embodiment of the instant invention illustrated in FIG. 8, a fifth chamber 102, being another manifold vacuum air chamber, this second manifold vacuum air chamber is added surrounding the first chamber 66 cylinder housing 34. The fifth chamber 102 cylinder housing 104 and the fifth chamber end walls 106 and 108 serve to surround the first chamber cylinder housing 34 and first chamber end walls 36 and 38 but are not in communication with the first chamber. The manifold vacuum air inlet passage 110 and outlet passage 112 are fitted through the fifth chamber end walls 106 and 108. Manifold vacuum air flowing through the fifth chamber 102 serves to further modulate the interior temperature of the first chamber 66 during fuel processing in applications where the fifth chamber is deemed necessary for such purpose.

Figure 16:
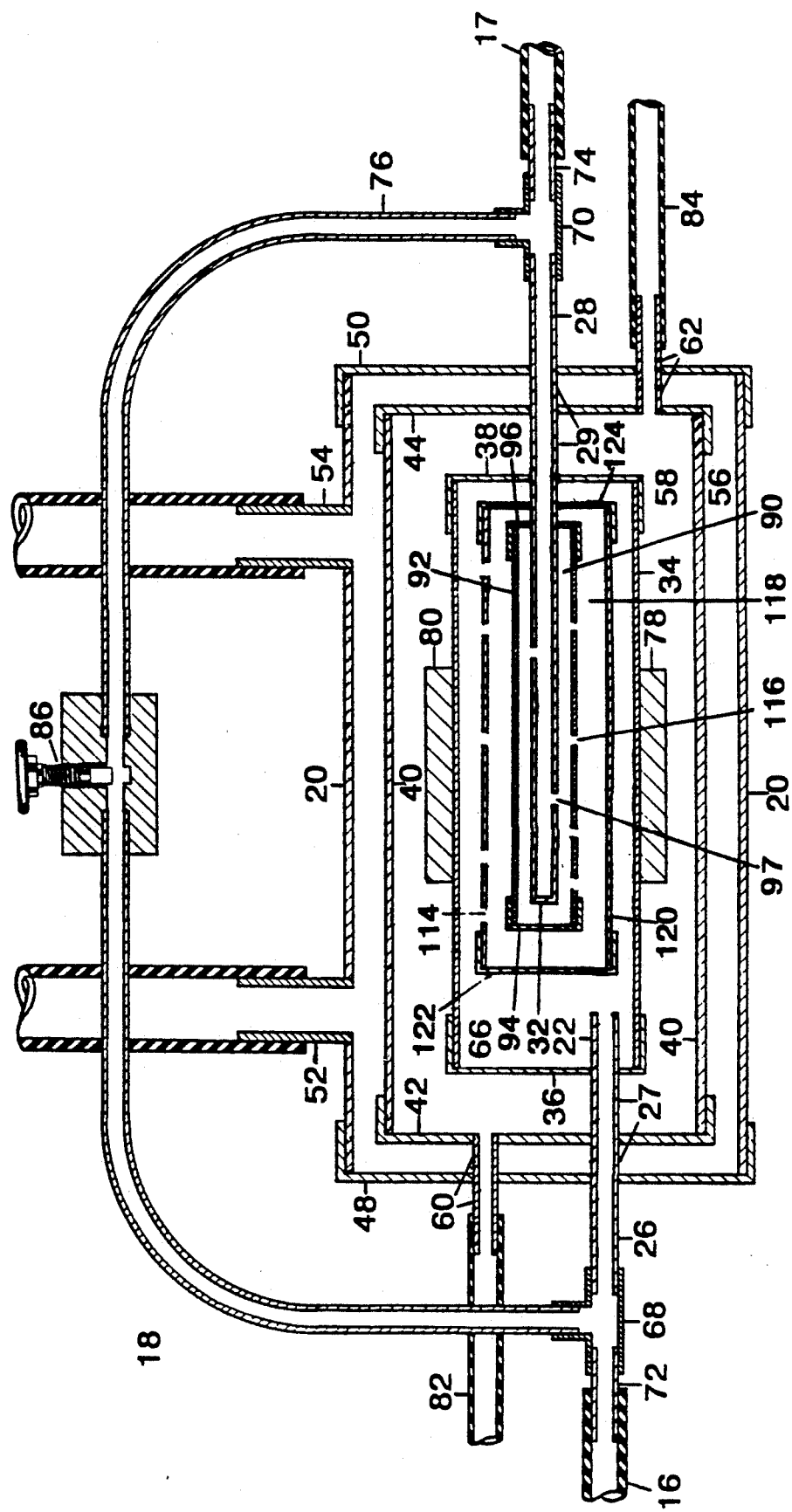
FIG. 16 is a cross sectional view of an alternative embodiment of the present invention.
Figure 17:
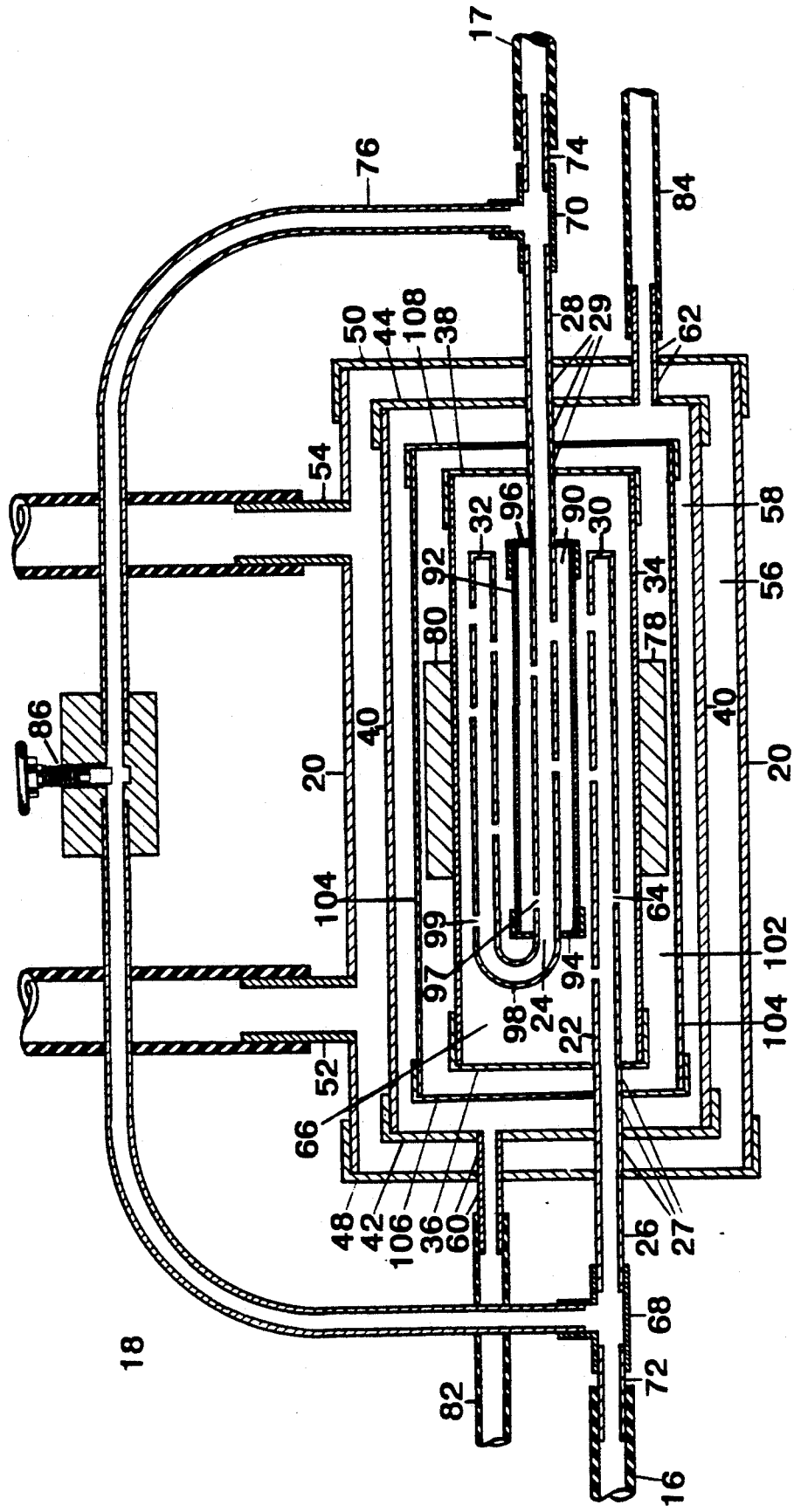
FIG. 17 is a cross sectional view of an alternative embodiment of the present invention.

In another embodiment of the instant invention illustrated in FIG. 16, the cylinder housing 34 for the first chamber 66 and the first chamber end walls 36 and 38 completely surround and encompass the cylinder housing walls 120 of the expansion valve (expansion valve chamber) 118 and the end walls of the expansion valve 122 and 124. The end wall of the first chamber 36 is fitted with the fuel inlet passage (26, 27 and 72) which allows the fuel to enter the first chamber 66. Situated totally within the expansion valve (expansion chamber) 118 is the forth chamber 90. Through the forth chamber cylinder housing 92 along its bottom most side, that side opposite the bypass pressure relief valve 76, are numerous perforations 116 allowing communication between the expansion valve (expansion chamber) 118 and the forth chamber 90.

The outer cylinder housing 120 walls of the expansion valve (expansion chamber) 118 are perforated 114 along their upper most side which is the same side as the bypass pressure relief valve 76. A perforated outlet fuel passage (29, 28 & 74) is situated within the forth chamber 90. This outlet fuel passage is blocked at its inner most end within the forth chamber by end piece 34.

Fuel entering the fuel inlet passage enters the first chamber and flows upward within the first chamber 66 and through the perforations in the expansion valve (expansion chamber) cylinder housing 118. The fuel is then forced downward and through the perforations in the forth chamber cylinder housing 116 and into the forth chamber 90. Thereafter, fuel enters the interior fuel outlet passage 24 through perforations therein 97 located within the forth chamber 90 and then out through the outlet fuel passage (24, 29, 28 & 74) to the fuel line and onward to the combustion chamber.

A second chamber 58 is fitted with manifold vacuum air inlet and outlet passages 60 and 62 respectively which allows the flow of manifold vacuum air to modulate the temperature within the second chamber 58. The first chamber cylinder housing 34 walls within in communication with the second chamber 58 are fitted with magnets 78 and 80.

The second chamber 58 is completely surrounded by the third chamber 56 through which third chamber cylinder housing 20 walls traverse the engine coolant inlet and outlet passages 52 and 54 respectively, which accommodate the flow of heated liquid engine coolant into and out of the third chamber 56. The third chambers 56 of the instant invention and all modifications thereof are designed to accept alternate heat sources other than liquid engine coolant, but the use of liquid engine coolant appears to be the most prevalent heat source which is to be used in conjunction with the instant invention.

The exterior fuel inlet passage (26 & 72) and the exterior fuel outlet passage (28 & 74) are fitted with a bypass pressure release valve 76 which, in conjunction with an optional adjustable valve fitted thereto 86 allow pressure within the first chamber 66, the expansion valve (expansion chamber) 118 and the forth chamber 90 to momentarily release through the bypass pressure release valve 76 then resume flow through the instant invention The expansion valve (expansion chamber) 118 serves to reduce the temperature of the fuel thereby chilling it to a certain extent before passing it through the instant invention.

In another embodiment of the instant invention illustrated on Exhibit 17, a fifth chamber 102, a dead air chamber, surrounds the first chamber 6. The fifth chamber cylinder housing 104 and the fifth chamber end walls 106 and 108 serve to insulate the first chamber 66 from the second chamber 58 In all other respects, this embodiment is the same as the embodiment of the instant invention depicted in Exhibit 7.

In another embodiment of the instant invention illustrated on Exhibit 18, the embodiment of the instant invention is the same as that illustrated in FIG. 7, with the exception that the forth chamber 90 found in the embodiment illustrated in FIG. 7 is completely absent from the invention.

Some, but not all, of the various modifications of the instant invention are stated in claims 40 through 55 and illustrated in FIGS. 7 through 18. Though these specific modifications and variations are illustrated herein, they are not meant to limit the instant invention to those shown.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A combustion emission reduction device for use in heating fluid fuels prior to combustion comprising:
   a first elongated housing defining a first chamber into which extend a fuel inlet passage and a fuel outlet passage, said passages having interior portions parallel to each other;
   an elongated second housing defining a second chamber which surrounds said first chamber, said second housing having a manifold vacuum air inlet passage and a manifold vacuum air outlet passage at each end;
   an elongated third housing defining a third chamber surrounding said second chamber, said third housing having an inlet and an outlet for circulating hot fluids in said third chamber; and
   a bypass line located outside said third housing having a pressure relief valve uppermost therein, said line connects said fuel inlet passage to said fuel outlet passage.

2. The device of claim 1, wherein said passages are closed at their ends and are perforated.

3. The device of claim 2, wherein said fuel outlet passage has an interior J-shaped portion which is disposed parallel and adjacent to another portion of said fuel outlet passage.

4. The device of claim 1, wherein a forth housing defining a forth chamber directly surrounds an interior portion of said fuel outlet passage.

5. The device of claim 4, wherein said forth housing is perforated.

6. The device of claim 4, wherein said fuel outlet passage has a J-shaped portion disposed outside of and adjacent to said forth housing.

7. The device of claim 5, wherein said fuel outlet passage is closed at its innermost end and is perforated.

8. The device of claim 4 or 7, wherein said fuel inlet passage is open at its innermost end and is shorter than said fuel outlet passage.

9. The device of claim 4, wherein said fuel outlet passage is open at its innermost end and is longer than said fuel inlet passage.

10. The device of claim 1, wherein said passages are directly connected to form a single straight perforated passage directly surrounded by a perforated forth housing defining a forth chamber.

11. The device of claim 1, wherein said valve is adjustable.

12. The device of claim 1, wherein magnets are attached an opposite sides of said first housing.

13. The device of claim 1, wherein a fifth housing defining a fifth chamber surrounds said first chamber and is within said second chamber, wherein a manifold vacuum inlet passage and a manifold vacuum outlet passage are connected to said fifth housing.

14. A combustion emission reduction device for use in heating fluid fuels prior to combustion comprising:
   a first elongated housing defining a first chamber and connected at one end to a fuel inlet passage;
   a perforated fuel outlet passage extending within said first housing, said outlet passage having its innermost end closed;
   an elongated second housing defining a second chamber which surrounds said first chamber, said second housing having a manifold vacuum air inlet passage and a manifold vacuum air outlet passage at each end;
   an elongated third housing defining a third chamber surrounding said second chamber, said third housing having an inlet and an outlet for circulating hot fluids in said third chamber;
   an elongated forth defining a forth chamber directly surrounding a portion of said fuel outlet passage and having a perforated bottom wall;
   expansion means comprising and elongated housing directly surrounding said forth housing and having a perforated top wall;
   a bypass line located outside said third housing having a pressure relief valve uppermost therein, said fuel inlet passage to said fuel outlet passage.

15. The device of claim 14, wherein said valve is adjustable.

16. The device of claim 14, wherein two magnets are attached on opposite sides of the first chamber.

* * * * *

UNITED STATES PATENT AND TRADEMARK OFFICE
CERTIFICATE OF CORRECTION

PATENT NO.  : 5,257,609
DATED       : November 2, 1993
INVENTOR(S) : Morgan P. Reed, et al.

It is certified that error appears in the above-indentified patent and that said Letters Patent is hereby corrected as shown below:

Col. 1, line 6 after "Anti-vaporlock Device" insert a --:--.
Col. 3, line 55 after "emitted" insert a --.--.
Col. 7, line 52 after "device" insert a --.--
Col. 13, line 35 "heating" should read --treating--..
Col. 14, line 21 "heating" should read --treating--

Signed and Sealed this

Fourth Day of July, 1995

Attest:

BRUCE LEHMAN

Attesting Officer

Commissioner of Patents and Trademarks